April 17, 1934.                W. CHAPMAN                1,955,715
                            COLOR PHOTOGRAPHY
                            Filed Jan. 6, 1932
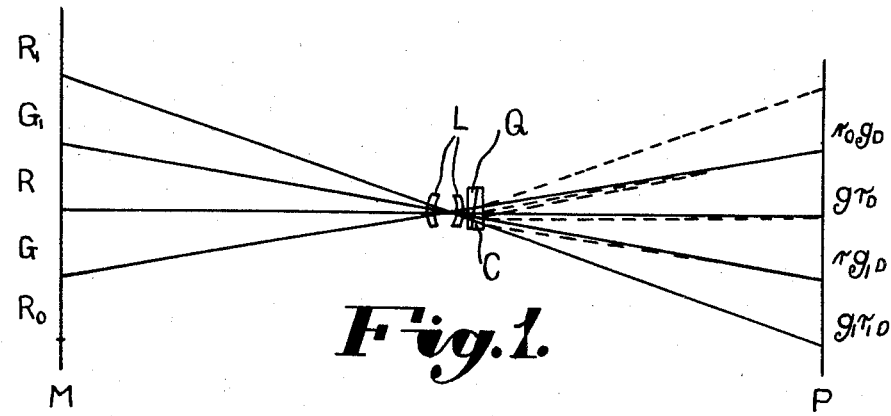
Fig.1.
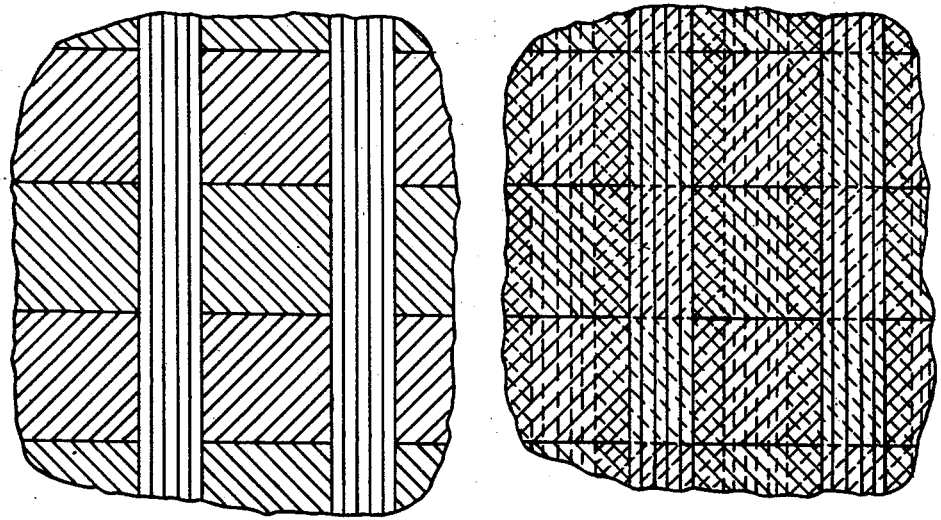
Fig.2.                Fig.3.
     
RED.    GREEN.   BLUE.   RED       GREEN     BLUE
                        DUPLICATE. DUPLICATE. DUPLICATE.
Inventor
Walter Chapman.
Per Patented Apr. 17, 1934

1,955,715

UNITED STATES PATENT OFFICE 1,955,715

COLOR PHOTOGRAPHY

Walter Chapman, London, England, assignor to Dufaycolor Limited, London, England Application January 6, 1932, Serial No. 585,155
In Great Britain January 28, 1931

1 Claim. (Cl. 88—24)

My invention relates to a method of producing multi-color photographic copies from a multi color master photograph and in which the photographic emulsion for both the master and the copies is coated on the multi color screen prior to exposure in the camera or printing machine so that the photographic image and the multi color screen are in permanent contact. It concerns two or more color systems, and is suitable for still photography or cinematography.

The outstanding difficulty in color photographs produced by exposing through a multi color screen placed immediately in front of the sensitized emulsion is the production of copies from such masters having the same area of exposed surface as the masters. It lies in the difficulty of exactly superimposing the color elements of the master on to the corresponding color elements of the copy when printing. In one commercial process the difficulty is completely overcome by having separate color screens, making a positive from the negatives without the color screens in situ, and then binding up a color screen in contact and registration with the positive. Since the color screen is merely laid on the photographic image, the method is not entirely satisfactory as the photographic emulsion will expand or contract during the processing of the original and the copy and will not be in correct registration with the separate color screen over the entire surface. Moreover if the bases, glass and the like, which carry the screen and the photographic image respectively are not truly plane the resulting separation will give rise to changes of color due to parallax.

To partly overcome this difficulty of color element registration various methods have been proposed for diffusing the image, the diffusion being effected by an optical device or by a mechanical movement such as for example a vibrating movement of the copy. Such methods however are somewhat haphazard, and in any case it is difficult, and probably impossible to forecast the area of the exposed surface and the definition of the pictures; so that in some cases quite poor pictures will be obtained from the same negatives. Also in a color cinematograph film a strip of pictures would contain a succession of pictures inconsistent in definition and color value.

It has heretofore been proposed in the projection printing of color screen positives or copies to employ prisms to divide the projected beam into three zones, but such heretofore proposed method has the disadvantage that to ensure equal intensity in the several images produced by the prisms and lens, correct allocation of the zones of lens aperture employed for each image is essential. Consequently, any alteration of the lens aperture causes the projected image to be unequally illuminated, one side receiving a predominance of light from one zone and vice versa.

My present invention obviates the necessity of actual visionary registration of the two sets of colored elements although the result obtained with a two color process is equivalent in value to exact registration of the like colored elements of the master and copy screens, and with a three color process consistently good results can be obtained by a suitable formation of the color elements of the screen for example as a regular succession of monochromatic lines and lines each containing in the direction parallel with the monochromatic lines successive rectangles or squares composed of two different colors as heretofore proposed. The monochromatic lines are half the width of the two color lines. These improvements are obtained according to my invention by the provision of means which doubles the image of the master so that the copy screen receives simultaneously two equally illuminated images of the single master image.

My invention consists in obtaining the color value effect of complete or substantial registration of the corresponding components of master and copy color screens by projecting on to the copy a double image of the master, the doubling being of a definite predetermined amount, as distinct from a mere diffusion of the master image or a succession of physical displacements of a single image as heretofore proposed.

In carrying the invention into practice, a doubling of the master image is produced in a definite direction by an optical doubling device which can be adjusted to suit the screen of the master photograph employed, and which produces two images which are sharply defined, and of equal intensity. The exact amount of separation between these two images is not important. With the three color screen above described, the image doubling device can be so orientated that its displacement in one direction of the images of the original color screen in the plane of the copy screen equals the length of one of the two color elements in the direction of the length of the monochromatic lines, and in a direction at right angles thereto an amount varying from the width of a monochromatic line to the width of a double color line. In the case of the two color system the doubling equals the pitch of the screen ruling. The amount of doubling is extremely small, for example using a 50 mm. focus lens in the printing machine and a screen having 32 colored elements to the millimetre then the angle of doubling is approximately one minute.

I produce this small amount of doubling by inserting either a slight prism or parallel plate of any suitable doubly refractive material placed at any suitable position between the master and the copy.

The image of the master multi color screen transparency will then consist of any one element with an image of the adjacent element approximately overlying it.

Since these two adjacent elements are of different colors they will combine to form one element with an additive color. The copy color elements, or parts of various color elements, on which these combined element images fall will analyze and only transmit the light of wave length peculiar to themselves. Therefore the double image lying on the multi color screen of the copy will be recorded on the copy emulsion as a single image which may be one of the master images only, or may consist of portions of both; but no master element image will be recorded in duplicate. Since the pitch of the color screen pattern is selected to be invisible to the spectator, then the want of alignment, if any, between various parts of the image will also be invisible.

I do not confine myself to a reproduction of the same size as the master; but can make either enlargements or reductions.

I will now describe a method of putting my invention into practice, with a two color system. It should clearly be understood that the aim of the invention is to produce a double image of the master multi-color screen transparency on the plane of the color screen of the copy whether the system employed be two, three or more colors. When therefore a two color system is employed in which the sum of the elements of either color covers approximately one half of the total area of the master then the doubling produced increases the useful printing area to that of the total area of the copy. When a three color system is employed the sum of the elements of a given color equal approximately one third of the total area of the master while the doubling of the image increases the useful printing area to two thirds that of the total area of the copy provided the master color screen is a geometric one for example as already described with the color elements in alternate sequence. If the master color screen consists of strewn elements so that like colors are in juxtaposition then the doubling only produces an increased intensity when like colors in the images overlap, and the useful printing area is limited to the extent of such overlapping of like colors.

For a two color system the color screen of the master would consist of parallel lines of alternate complementary colors, for example red-orange and blue-green. The lines should be of equal width with their edges in contact. If such a master be inserted in an optical printer, and focussed so that the image of these colored lines lies on the surface of the color screen overlying the copy emulsion, then the copy emulsion will only be affected over the areas where the red-orange master images correspond with the red-orange copy elements, and the blue-green images with the blue-green copy elements.

The color screen on the copy can be any suitable two color screen, and its design need not necessarily bear any relation to the color screen on the master. It must, however consist of two colors which will analyze to the required degree of efficiency the colored beams of light proceeding from the master. A double image prism is now placed between the lens and the plane of the projected image, and is so mounted that it can be rotated in a plane at right angles to, and be moved along, the lens axis by a suitable mechanical device such as a rack and pinion. The double image prism should be such that when it is close up to the lens it produces a doubling in the plane of the projected image greater than the pitch of the image of the master color screen elements. If the image on the master now be examined under a magnification sufficient to resolve the master color screen elements then by rotation of the double image prism, and by moving it along the axis of the lens, the correct orientation and displacement can be secured. As the color elements are small I find it convenient to mount a microscope with its object plane in the same plane as that of the projected double image of the master. The ground surface of the focussing screen will obliterate the image of the master color screen in the microscope, and it should either be supplied with a transparent cover glass cemented on with a graticule in the cement layer or the focussing screen should be removed after the image of the master screen has been focussed; a slight alteration in the focus of the examining microscope being made to correct for the thickness of the focussing screen. If a spot of dust or mark on the master be observed, then the direction of doubling and its amount can be compared with the pitch and orientation of the master color screen. It will necessarily follow that the best setting will have been obtained when the observed image of a piece of the master color screen, without a photographic image on it, appears practically colorless. A color screen coated with sensitized emulsion is then placed in the plane of the projected image. The size and arrangement of the color elements of this copy need bear no relation to that of the master color screen for example I have employed a master color screen of a geometric pattern having 32 color elements to the millimeter and without any alteration to the adjustment of the printing machine, doubling device or projection lens, have obtained successful copies of it on an "Agfa" color plate, an irregular mosaic of colored gum particles, and on a geometric pattern color plate of a different design from the master and having only 14 color elements to the millimetre. Since the whole area of the copy screen is illuminated by a mixture of the complementary colored light then the whole area of the sensitized emulsion will be exposed; each colored element only transmitting the light peculiar to itself. Although the actual design of the elements of the copy screen are of no importance, it may be necessary when preparing it to so locate the direction of its rulings relative to those of the master color screen as to avoid diffraction effects producing "moire" lines on the positive.

With regard to the three color screen previously referred to, it is convenient when making the color screens to leave the final ruling as a series of lines extending uninterruptedly across or along the film or plate breaking the parallel lines of two other colors into successions of small colored rectangles or squares parallel with and between the monochromatic lines. These lines are ruled at an angle of 90° with the previous two colored rulings thus forming a design consisting of one line of alternate two colored rectangles or squares, and one line of the same color throughout, these being alternated to cover the entire surface. The sum of the elements of each of the three colors employed covers approximately one third of the total area of the photograph.

The image doubling device may be a single plate or very slight prism of a strongly doubly refracting mineral such as Iceland spar; or a prism of a larger angle of a slightly doubly refracting mineral such as quartz, combined with another prism of either quartz or glass to achromatize and render one of the rays nondeviating. Many such devices are known, and the use of any material which produces double refraction either plus or minus is contemplated in the scope of my invention as defined by the expressions "means for producing a double image" or "double image device".

In order that my invention may be clearly understood I have appended hereto a sheet of drawings illustrating diagrammatically an embodiment thereof, and wherein Fig. 1 is a diagram showing the relative positions of the master and positive photographs and the bi-prism.

Fig. 2 shows to an exaggeratedly large scale the arrangement of color elements on the film, and Fig. 3 shows the manner of overlapping the color elements on the positive by means of my invention.

Fig. 1 shows a method of putting my invention into practice with a two color system and represents a diagrammatic sectional view in a plane containing the axis of the projection lens and lying at right angles to the master M and print P photographs.

R and G represent cross sections of the color elements red and green respectively of a two color line screen on which the master photographic image lies.

An image of these color elements is projected by the lens L on to the surface of the color elements overlying a sensitized emulsion in the plane F. These color elements are not indicated in the diagram but may be of any pattern provided they consist of two color elements having the same aggregate areas and which transmit light of similar wave length to that passing through the master color screen M. It is assumed that these print or copy color screen elements have no fixed position relative to the master color screen element images lying on them, but vary in position for each copy made.

The image of element R is projected as $r$, and G as $g$. The rays of light emerging from the lens L pass through an optical double image device such for example as the Fresnel biprism described in College Physics by Arthur L. Kimball New York 1917 2nd edition page 660. The example shown is of quartz Q with a glass compensator C. The glass has a mean refractive index similar to that of the ordinary ray of quartz so that the ordinary rays form an image of element R at $r$ as shown by the full lines, and the extraordinary rays an image of R at $r_D$ as shown by the broken lines. The angle of the quartz prism is so selected that the two images $r$ and $r_D$ lie in contact along one edge that is to say the image displacement is in a direction at right angles to the length of the screen lines and is of one color element image width. Since every colored element of the master M is duplicated, it follows that the surface of the copy color screen P is covered by a mixture of the two colored lights, moderated by the photographic image on the master screen M. The red elements will transmit all red light falling on them and absorb the green light which the green elements will function vice versa.

Fig. 2 represents a three color screen of the Lumiere Dufay type in which a green colored area has been impressed with grease lines, bleached, dyed red cleansed; again grease lined, bleached and dyed blue, thus producing a design of red and green squares separated by a blue line. The blue line has a width half that of the side of the squares in order to give equal areas to the three colors.

Fig. 3 represents this design with the said design laid upon it having a displacement in the direction and distance indicated by the arrow. This displacement is produced by identical methods to that shown for the two color screen in Fig. 1. It will be seen that any given area is covered by two cross hatchings one full and one in broken lines.

What I claim is:—

Means for overcoming the non-registration of the color element images of the master color screen with those of the copy in producing color screen photographic transparencies from color screen master photographic transparencies comprising a projector, an optical device in conjunction with said projector for doubling the image projected from the master transparency, the copy transparency being formed with a regular succession of monochromatic lines and lines each containing in the direction parallel with the monochromatic lines successive rectangles or squares composed of two different colors, the image doubling device being so orientated that its displacement in one direction of the images of the original color screen in the plane of the copy screen equals the length of one of the two color elements in the direction of the length of the monochromatic lines, and in a direction at right angles thereto an amount varying from the width of a monochromatic line to the width of a double color line.

WALTER CHAPMAN.